United States Patent
Winter

(10) Patent No.: US 6,674,699 B2
(45) Date of Patent: Jan. 6, 2004

(54) METHOD FOR IDENTIFYING A RESERVED DATA AREA, AND CORRESPONDING APPARATUS

(75) Inventor: Marco Winter, Hannover (DE)

(73) Assignee: Thomson Licensing S.A., Boulogne (FR)

(*) Notice: Subject to any disclaimer, the term of this patent is extended or adjusted under 35 U.S.C. 154(b) by 87 days.

(21) Appl. No.: 09/905,216

(22) Filed: Jul. 13, 2001

(65) Prior Publication Data

US 2002/0059277 A1 May 16, 2002

(30) Foreign Application Priority Data

Jul. 21, 2000 (DE) .......................... 100 35 955

(51) Int. Cl.$^7$ ................................. G11B 7/00
(52) U.S. Cl. ................. 369/47.15; 369/47.46; 369/53.1; 369/59.1; 369/275.3
(58) Field of Search ................ 369/47.1, 47.15, 369/47.3, 47.46, 47.53, 53.1, 53.21, 59.1, 59.14, 59.25, 275.1, 275.3

(56) References Cited

U.S. PATENT DOCUMENTS

| | | | |
|---|---|---|---|
| 5,983,242 A | | 11/1999 | Brown et al. |
| 6,330,210 B1 | * | 12/2001 | Weirauch et al. ........ 369/47.15 |
| 6,396,798 B1 | * | 5/2002 | Takemura et al. ....... 369/275.3 |
| 6,469,978 B1 | * | 10/2002 | Ohata et al. ............. 369/275.3 |

OTHER PUBLICATIONS

Ein Standard. In Funkschau, Jul. 1993, S. 126 (Translation will follow).

* cited by examiner

Primary Examiner—Muhammad Edun
(74) Attorney, Agent, or Firm—Joseph S. Tripoli; Joseph J. Laks; Harvey D. Fried

(57) ABSTRACT

The present invention relates to a method for identifying a data area D,E or D,G, reserved in accordance with a first specification, as useful data area G in accordance with a second specification. Compatibility between first specification and second specification, that is to say different versions of a specification, is achieved according to the invention by virtue of the fact that a header area D assigned to the reserved data area D,E or D,G is provided, which header area, in the event of transmission, is provided with a status information item "reserved" if the reserved data area E contains no or no checked useful data in accordance with the second specification, and is provided with a status information item "valid" if the reserved data area G contains useful data in accordance with the second specification, or from which header area a status information item is taken in the event of reception, the reserved data area E,G, in the case of status information "valid", being identified as containing valid useful data in accordance with the second specification, and, in the case of status information "reserved", being identified as containing no or no checked useful data in accordance with the second specification.

12 Claims, 2 Drawing Sheets

METHOD FOR IDENTIFYING A RESERVED DATA AREA, AND CORRESPONDING APPARATUS

FIELD OF THE INVENTION

The present invention relates to a method for identifying a data area which is reserved in accordance with a first specification but may contain useful data in accordance with a second specification, and corresponding apparatuses and data carriers.

BACKGROUND OF THE INVENTION

Fields which are reserved fields in accordance with a first version of a standard, hereinafter mostly referred to as first specification, may have to be utilized by apparatuses of later versions of the standard, hereinafter mostly referred to as second specification, for example in order to enable further functions which had not yet been taken into consideration at the time when the first specification was defined. For this purpose, however, there must be a clear definition of how apparatuses of earlier versions handle these fields. Handling includes, inter alia, reading, writing or editing the data of the data carrier.

The reserved fields have hitherto been ignored in accordance with the earlier versions of a specification. Only more recent versions of the specification utilize the reserved fields. This has the disadvantage that the earlier versions of the specification do not prescribe how these fields reserved in accordance with the earlier version are to be handled in the event of editing, that is to say firstly reading, then changing, then rewriting. The reserved fields then have an undefined content and cannot be correctly interpreted by apparatuses which operate in accordance with the more recent version. Consequently, compatibility between apparatuses of different versions of a specification is not ensured.

It is an object of the invention to propose a method which enables compatibility between different versions of a specification, hereinafter referred to as first specification and second specification, and corresponding apparatuses and data carriers.

SUMMARY OF THE INVENTION

According to the invention, in order to identify a data area, which is reserved in accordance with a first specification, as containing useful data in accordance with a second specification, it is provided that a header area assigned to the reserved data area is present, which header area, in the event of transmission, is provided with a status information item "reserved" if the reserved data area contains no or no checked useful data in accordance with the second specification, and, in the event of transmission, is provided with a status information item "valid" if the reserved data area contains useful data in accordance with the second specification. In the event of reception, a status information item is taken from the header area, the reserved data area, in the case of status information "valid", being identified as containing valid useful data in accordance with the second specification, or else as containing no or no checked useful data in accordance with the second specification if the status information "reserved" is present. This method has the advantage that reserved data areas can be received and/or transmitted both by apparatus which operate according to the first specification and by those which operate according to the second specification, without compatibility problems arising. In this case, transmission means both line-based or line-free transmission and recording on storage media. The latter are to be regarded as, for example, data carriers such as optical recording media CD or DVD, magnetic recording media, memory modules, in each case both unwriteable and writeable, irrespective of their physical construction. Reception is to be regarded as both the reading of such storage media and the reception of data transmitted in a line-based or line-free manner. The reserved data area generally contains no useful data if it falls completely under the first specification. By contrast, it contains no checked data if data which correspond to the second specification are transmitted in accordance with the first specification.

For an apparatus which operates according to the first specification, the second specification is absent. According to the invention, it does not evaluate as useful data the data contained in the reserved data area, even if these are created in accordance with the second specification, and the status information thus indicates "valid". These useful data are ignored for the evaluation, that is to say, for example, the conditioning for representation on a screen or another suitable outputting or further processing. This has the advantage that data transmitted in accordance with the second specification do not lead to an undefined behaviour of an older device operating according to the first specification, but rather merely to the absence of certain functions which are not present anyway in accordance with the first specification.

According to the invention, useful data which are created in accordance with the second specification, but are received in accordance with the first specification, are transmitted unchanged. This has the advantage that the corresponding information is not lost even if it is transmitted in an intermediate step in accordance with the first specification.

If the reserved data area is assigned a data block, then, according to the invention, the status information "valid" is used for transmission purposes if the data block is transmitted unchanged. By contrast, if the data block is transmitted in changed form, then the status information is set to "reserved". This has the advantage that, in the event of totally unchanged transmission of the received data, the content thereof is not changed even if reception and transmission are effected in accordance with the first specification. In this case, it can be assumed that the useful data in the area reserved in accordance with the first specification are correct. By contrast, if a change to the data contained in the data block has been performed after reception, then this can result in the correctness of the useful data contained in the area reserved in accordance with the first specification, for example if the said useful data are combined with data situated in the associated data block. In this case, the status information is set to "reserved" and an apparatus operating in accordance with the second specification recognizes that the corresponding useful data should at least not be used unchecked. The data block assigned to the reserved data area can perfectly well be fragmented, in other words need not comprise a contiguous piece; it can either include the reserved data area or be separate from the latter. However, the way in which the data block assigned to the reserved data area is defined must already be fixed in the first specification.

According to the invention, not only a change in the content of a data block but also a change in the latter's relative position, for example in the temporal sequence of a plurality of data blocks or the spatial arrangement relative to other data blocks, is regarded as a change in the data block. This has the advantage that even combinations of the useful data which are connected with this relative position and are impaired by the new arrangement are not regarded as checked.

In accordance with the invention, it is furthermore provided that in the absence of the second specification, a newly created or copied reserved data area is transmitted with status information "reserved" and useful data of the value zero. This has the advantage that apparatuses of the second specification can distinguish the copied data areas from the original data area. That is expedient since an apparatus of the first specification cannot know whether the useful data generated by means of the second specification are still valid as copy. In case of doubt, it is therefore expedient to initialize the reserved area of the copied data area according to the rules of the first specification.

According to the invention, given the presence of the second specification and reception of a reserved data area identified with status information "reserved", the content of the said data area is checked for validity using the second specification and, if this validity exists, is regarded as valid useful data in accordance with the second specification for evaluation and/or transmission purposes. This has the advantage that useful data whose conceptual content may have been changed are also checked and, if the conceptual content is unchanged, are regarded as correct for further processing and are also marked as such in the event of transmission. Such checking using the second specification consists, in a simple case, in checking whether or not the corresponding data have a combination with data of the data block. In the latter case, they are regarded as correct. In another case, the checking consists for example in a plausibility check which is carried out using the boundary conditions prescribed in the second specification.

It is advantageous that in the specification, both in the first and in the second specification, it is additionally stipulated that there is also stored or transmitted the version number of the specification according to which the apparatus which was the last to change or augment the data operates. Consequently, apparatuses of a certain specification, when receiving the data, can immediately assess which data can still be valid for them, and which cannot. The storage of the version number is performed for example using two bytes. In this case, the first byte contains the version number element to the left of the point and the second byte contains the version number element to the right of the point. Example: for the version 12.34, 12 is stored in the first byte and 34 is stored in the second byte.

It is advantageous that a further type of reserved data areas is also provided, which can be identified in accordance with a different method. This increases the flexibility of the configuration of the different specifications.

The header area preferably consists of a single bit. This requires only a small consumption of usable data area. In certain cases, it is expedient to provide larger header areas, for example if it is already known that a plurality of different versions will follow the first specification.

If the entire reserved data area for useful data is not required for the second specification, then, according to the invention, the data area reserved in accordance with the first specification is divided, in accordance with the second specification, into a first useful data area and a second, reserved area, which is then provided for receiving useful data in accordance with a further, future specification.

An apparatus according to the invention for receiving and/or transmitting data which may contain data areas reserved in accordance with a first specification identifies these as containing useful data in accordance with a second specification, by one of the methods mentioned above.

A data carrier according to the invention, which data carrier has data areas which are reserved in accordance with a first specification and contain useful data in accordance with a second specification, has a header area for a reserved data area, in which header area the data area is identified as reserved in accordance with a first specification or containing useful data in accordance with a second specification. This data carrier can be identified with regard to the reserved data area preferably in accordance with one of the methods mentioned above.

Further advantages of the invention are specified in the following description of advantageous configurations of the invention. It is understood that supplementations or modifications that are within the abilities of persons skilled in the art likewise lie within the scope of the invention.

DETAILED DESCRIPTION OF PREFERRED EMBODIMENTS

Figure 1:
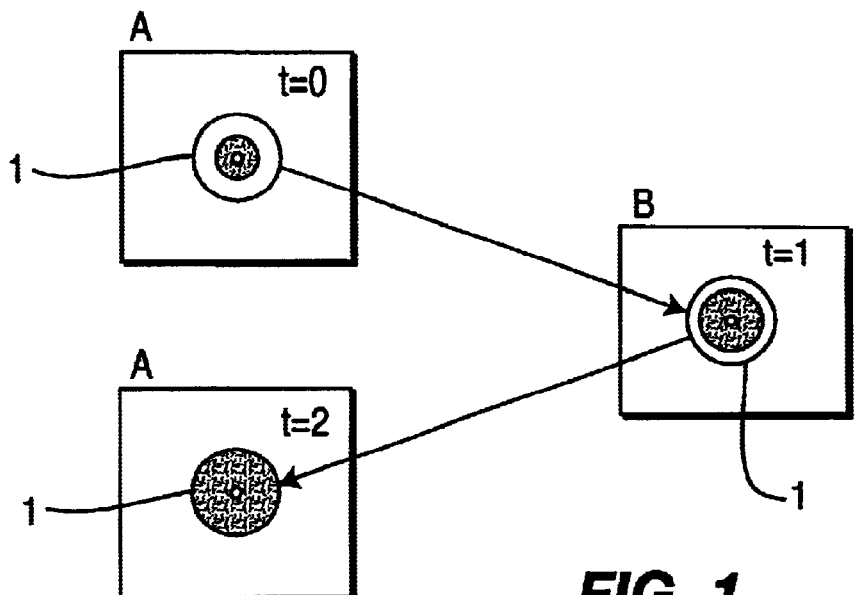
FIG. 1 shows a data carrier according to the invention in different apparatuses.

FIG. 1 shows, in a diagrammatic illustration, a data carrier 1 according to the invention at different points in time t=0, t=1 and t=2 in different apparatuses A,B. The extent to which the data carrier 1 has been written to differs at the different points in time, which is indicated by the area marked dark. Apparatus A operates according to the more recent version of a standard, the second specification, while apparatus B operates according to the earlier version, the first specification. These specifications differ in that a data area that is reserved in the first specification is defined as containing useful data in the second specification.

According to the invention, the reserved data areas, hereinafter mostly referred to as fields, are treated as a data packet. This data packet, having N bits, always comprises a one-bit header D, see FIG. 4, and a useful data area E comprising (N−1) bits. The most significant bit of the reserved field D,E is the one-bit header D and the useful data area E encompasses the remaining bits of the reserved field.

The header D provides information about whether the useful data area D,E was stored as reserved area, in accordance with the earlier first specification, or as field G comprising useful data, in accordance with the more recent, second specification. In this case, the apparatus in accordance with an earlier specification never overwrites the useful data area G. Only the one-bit header D is set.

Rules according to the invention for handling reserved fields in accordance with the first specification are:

If a new reserved field D,E is stored, then the useful data area E shall contain zero as initial value. The one-bit header D shall be set to "reserved".

If the data block C or F to which the reserved field D,E or D,G directly belongs is read out and stored again unchanged, then neither the one-bit header D nor the useful data area E or G shall be changed.

If the data block C or F to which the reserved field D,E or D,G directly belongs is read out and stored again in changed form, then the one-bit header D shall be set to "reserved" and the useful data area E or G shall remain unchanged, as it was read from the medium.

If a reserved field D,E or D,G is produced by the copying of another reserved field D,E or D,G, then the useful data field E of the copied field D,E shall contain the initial value zero. The one-bit header D of the copied field D,E shall be set to "reserved".

The data block which belongs directly to the reserved field D,E or D,G must be stipulated by the earlier specification. In the simplest case, this is respectively the contiguous block C or F in accordance with FIG. 4. However, a fragmented data block, for example comprising the data areas C1, C3, C5, is also possible.

Rules for handling formerly reserved fields D,E or D,G in accordance with the more recent, second specification are:

If a formerly reserved field D,E or D,G is read out and the one-bit header D indicates "valid", then the useful data area G contains valid data for this specification.

If a formerly reserved field D,E or D,G is read out and the one-bit header D indicates "reserved", then the data block C,F was written in accordance with an earlier specification. Either this data block C,F was completely generated anew, and then the useful data area E,G is set to zero, or the data block C,F is changed, and the useful data area E,G can then contain an arbitrary value, including zero. Consequently, the useful data area E,G can contain invalid data in this case. The more recent specification should provide methods which allow a statement as to how and whether the remaining data of the useful data area can be utilized.

If a formerly reserved field D,E or D,G is stored and the useful data area G in accordance with the second specification contains unambiguously valid data, then the one-bit header D shall be set to "valid". Otherwise, the one-bit header D shall be stored in a manner set to "reserved".

Exceptions to the above rules are possible according to the invention if they are expressly described in the corresponding specifications. Thus, not all reserved fields have to be handled according to these rules. By way of example, fields which comprise only a small number of bits are not necessarily suitable for this format. For example fields having a size of 8 bits or more should be handled in this way. It is expedient, therefore, to define a number of types of reserved fields res1, res2, res3:

res1: reserved field. Content may be any arbitrary value. Shall always be set to zero in the event of writing.

res2: reserved field. Content may be any arbitrary value. Read value shall be stored unchanged. Zero shall be used as initial value.

res3: the first bit (most significant bit) of the reserved field D,E or D,G is the one-bit header D; All subsequent bits of this reserved field belong to the useful data area E or G.

Figure 4:
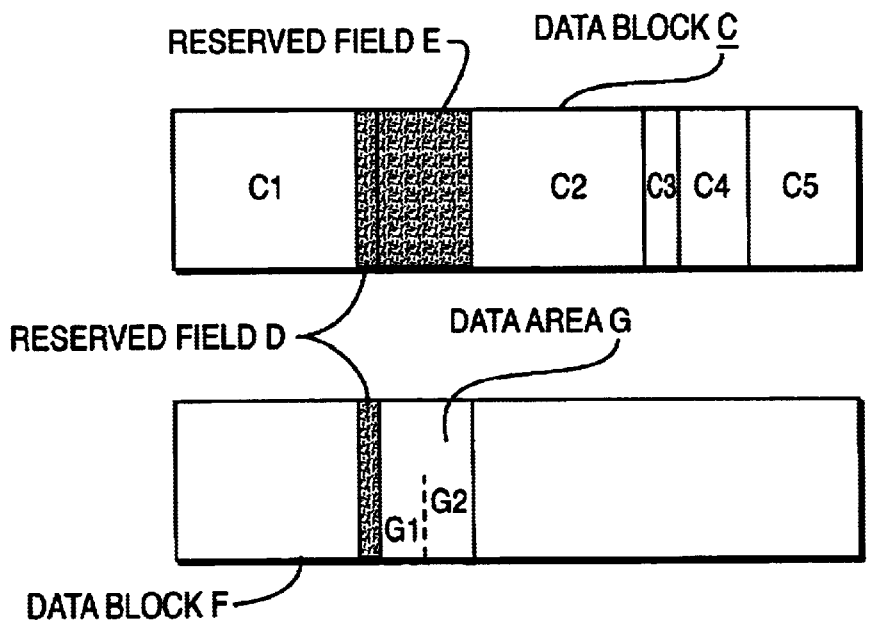
FIG. 4 shows data blocks according to the invention.

The type of reserved field in accordance with res1 or res2 is realized diagrammatically in FIG. 4, for example in field C4, while res3 essentially corresponds to the method according to the invention. In this case, the following holds true:

If the one-bit header D contains a 0, then this field was stored by an apparatus of the first specification or of an earlier specification. Data from a later specification than the first specification may also be situated in the useful data area. However, the validity of the useful data area E,G can no longer be ensured by the specification with which writing was effected, that is to say the first or earlier specification.

If the one-bit header contains a 1, then valid data are stored in the useful data area of this field by an apparatus of the second or a later specification.

With the method defined according to the invention, it is now possible to exchange media 1 between an apparatus A of a new specification and an apparatus B of an earlier specification, as illustrated in FIG. 1. The medium 1—represented as a disc—is, for example, a write-many disc and the grey area of the medium 1 represented is intended to represent the occupancy of the medium 1. At the point in time t=2, the medium 1 is full. At the point in time t=1, apparatus B leaves unchanged, as far as possible, the data written from apparatus A, and only attaches further data. At the point in time t=2, despite the data that have additionally been attached, and under certain circumstances changed, in the meantime by apparatus B at the point in time t=1, apparatus A can retrieve the information recorded at the point in time t=0 and can reuse it at least for the most part. Only in the case of changes in the data block which change the conceptual content of the useful data in the formerly reserved data area, for example pointers that now point to changed and thus incorrect data, data can not readily be used. Consequently, according to the invention, it is even possible for an older apparatus to write to media of newer apparatuses without the compatibility being unreasonably impaired.

Figure 2:
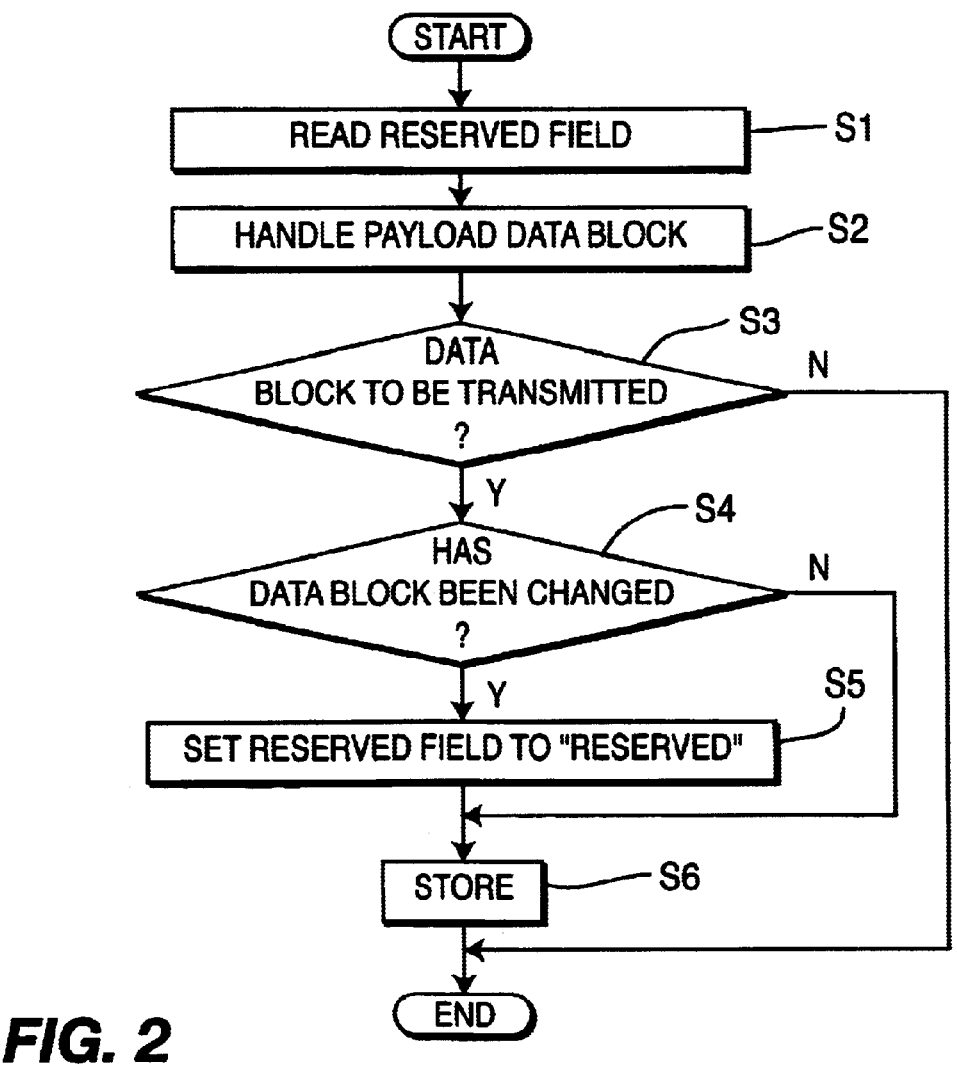
FIG. 2 shows a method according to the invention for a first specification.

FIG. 2 shows the sequence in respect of how an apparatus B of the earlier specification reads in, interprets and rewrites a reserved field. In step S1, the reserved field D,E or D,G is read. In step S2, the data block C or F assigned to the reserved field D,E or D,G is handled, for example partly changed, edited. In step S3, a check is made to determine whether the data block C or F is to be transmitted, that is to say is to be stored on the medium 1. If this is the case, then there is a branch to step S4, otherwise the operation is ended. In step S4, a check is made to determine whether the data block to which the reserved field D,E or D,G belongs has been changed by the processing. If this is not the case, then the data block C or F is stored unchanged in step S6. Otherwise, in step S5, the one-bit header D of the reserved field is set to "reserved" and storage is then performed in step S6.

Figure 3:
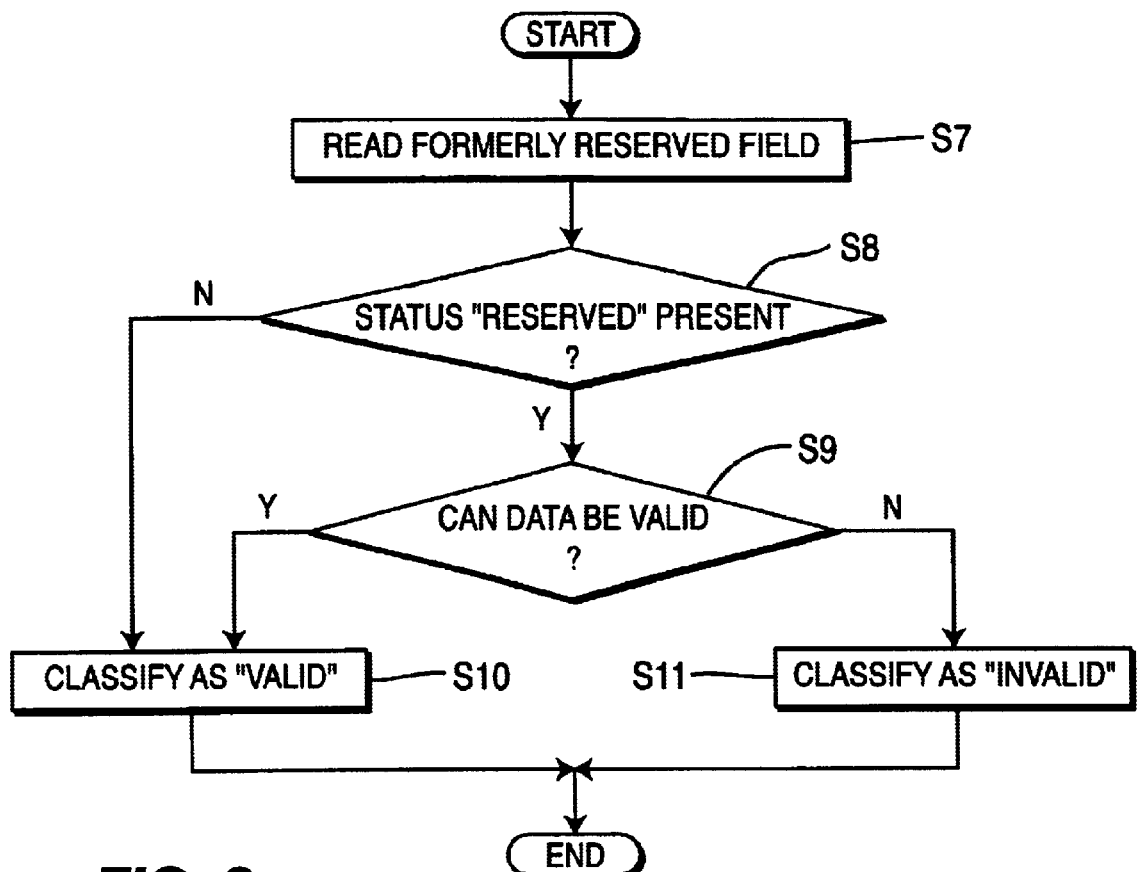
FIG. 3 shows a method according to the invention for a second specification.

FIG. 3 shows the sequence in respect of how an apparatus A of the more recent specification reads in and interprets a formerly reserved field D,E or D,G. In step S7, the field D,E or D,G formerly reserved, that is to say in the first specification, is read. In step S8, a check is made to determine whether the status information "reserved" is present. If this is not the case, then there is a branch to step S10, otherwise to step S9. In step S9, a check is made to determine whether or not it is possible, with reference to the stipulations made in the second specification, for the useful data situated in the formerly reserved data area E,G to be valid, for example because they cannot be affected by changes in the data block C1–C5. In the first case, the useful data in the area E,G are regarded as valid in step S10 and enabled for further utilization. Otherwise, they are classified as invalid in step S11, and excluded from further utilization.

FIG. 4 shows the two data blocks C and F as an example. The data block C is directly assigned the reserved field D,E, marked grey. After a transition from a first specification to a second specification, a so-called "version-up", the definition of the data block C has been changed, so that the data block F exists in the new specification and replaces the data block C in accordance with the first specification. Data block F differs from the data block C only through the utilization of the formerly reserved field D,G. In other words, the data area G now contains useful data of the data block F. As a further-reaching variant, division into a first useful data area G1 and a further, reserved area G2 is represented in the lower area of the field G. The area G2 is provided for example for use in accordance with a third specification. Here, too, if type res3 is used, a header area (not explicitly represented here) in accordance with the header D is provided.

In accordance with the description, what are referred to as reserved fields are data areas which are marked in two different ways. Either as reserved area E or as useful data field G. In accordance with the invention, earlier specifications never overwrite the useful data, but rather mark the field only as a reserved area. More recent specifications thus recognize that the content of this field is possibly no longer valid, since these data were stored without knowledge about their content in accordance with an earlier specification.

A version-up is relatively easy to implement in accordance with the invention, since the behaviour of earlier specifications is defined and thus calculable for more recent specifications. More recent specifications are thus enabled to store their data in the formerly reserved fields, without running the risk that these data will be overwritten by earlier specifications. In this case, more recent specifications have the security of recognizing whether earlier specifications have "touched" your data. The present invention is not restricted to the examples described. Any type of specification which defines data areas can be designed in accordance with the invention.

What is claimed is:

1. A method for handling data on a data carrier having at least one data area for further functions which forms a reserved area when interpreted in accordance with a first specification, said data area for further functions being usable as a header area with at least one bit for a status information item, or being usable at least in part as a useful data area when interpreted in accordance with a second specification, said method comprising the steps of:

in the event of reception, reading said status information item from said header area;

setting said status information item to a first value designating "reserved" whenever said data on said data carrier have been generated or processed in a way which implies that a content of said data area for further functions no longer complies with said second specification;

setting said status information item to a second value designating "valid" whenever said data on said data carrier have been generated or processed in a way which implies that a content of said data area for further functions does comply with said second specification; and, in the event of transmission, transmitting said status information item together with said header data.

2. The method according to claim 1, further comprising the step of, in cases where said method is being performed in a context which is compliant with said first specification, ignoring useful data of said data area for further functions for evaluation purposes, irrespective of said value of said status information item.

3. The method according to claim 1, further comprising the step of, in cases where said method is being performed in a context which is compliant with said first specification, transmitting in an unchanged way useful data of said data area for further functions.

4. The method according to claim 1, further comprising the steps of:

in cases where said data area for further functions is associated with a data block from amongst said data on said data carrier, setting said status information item to said second value for transmission purposes if said data block is transmitted unchanged; and, in cases where said data area for further functions is associated with a data block from among said data on said data carrier, setting said status information item to said first value if said data block is transmitted in changed form.

5. The method according to claim 1, further comprising the step of, in cases where said data area for further functions is associated with a data block from amongst said data on said data carrier, setting said status information item to said first value for transmission purposes if said data block has been subjected to a change in its relative position.

6. The method according to claim 1, further comprising at least one of the following steps:

in cases where said method is being performed in a context which is compliant to said first specification, ignoring useful data of said data area for further functions for evaluation purposes, irrespective of said value of said status information item;

in cases where said method is being performed in a context which is compliant to said first specification, transmitting in an unchanged way useful data of said data area for further functions;

in cases where said data area for further functions is associated with a data block from amongst said data on said data carrier, setting said status information item to said second value for transmission purposes if said data block is transmitted unchanged;

in cases where said data area for further functions is associated with a data block from amongst said data on said data carrier, setting said status information item to said first value if said data block is transmitted in changed form; and, in cases where said data area for further functions is associated with a data block from amongst said data on said data carrier, setting said status information item to said first value for transmission purposes if said data block has been subjected to a change in its relative position.

7. The method according to claim 1, further comprising the step of, in cases where said method is being performed in a context which is compliant to said first specification, transmitting a newly created or duplicated data area for further functions with said status information item set to said first value and useful data of said data area for further functions set to a value of zero.

8. The method according to claim 1, further comprising the steps of:

in cases where said method is being performed in a context which is compliant to said second specification, and where one of said data areas for further functions has been received, and where said status information item of said data area for further functions has said first value, checking for validity the content of said data area for further functions using said second specification; and subsequently, if a result of said checking is positive, regarding for evaluation and/or transmission purposes useful data of said data area for further functions as valid data in accordance with said second specification.

9. An apparatus for receiving or transmitting data to or from a data area for further functions, said area forming a reserved area when interpreted in accordance with a first specification, said data area for further functions being usable as a header area with at least one bit for a status information item, or being usable at least in part as a useful data area when interpreted in accordance with a second specification, said apparatus comprising:

means operable in the event of reception for reading said status information item from said header area;

means for setting said status information item to a first value designating "reserved" whenever said data on said data carrier have been generated or processed in a way which implies that a content of said data area for further functions no longer complies with said second specification;

means for setting said status information item to a second value designating "valid" whenever said data on said data carrier have been generated or processed in a way which implies that a content of said data area for further functions does comply with said second specification; and, means operable in the event of transmission for transmitting said status information item together with said header data.

10. The apparatus of claim 9, further comprising:

means operable when data received to said data area is processed in a manner compliant with said second specification, and where said status information item of said data area for further functions has said first value, for checking validity of the content of said data area for further functions using said second specification; and, means operable if a result of said checking is positive, for designating said checked data as useful data in accordance with said second specification for purposes of further evaluation and/or transmission purposes.

11. A data carrier, comprising:

a data area for further functions having reserved areas when interpreted in accordance with a first specification;

said data area for further functions having a header area comprising a status information item of at least one bit; and, said status information item indicating whether or not said data area for further functions is usable as a useful data area compliant with a second specification.

12. A first data carrier programmed in accordance with a routine set of instructions for implementing a method of data processing with a second data carrier, said method comprising the steps of:

designating at least one data area of said second data carrier for further functions, which can form either a reserved area when interpreted in accordance with a first specification or a useful data area, with a header area for a status information item of at least one bit, when interpreted in accordance with a second specification;

in the event of reception, reading said status information item from said header area;

setting said status information item to a first value designating "reserved" whenever said data on said data carrier have been generated or processed in a way which implies that a content of said data area for further functions no longer complies with said second specification;

setting said status information item to a second value designating "valid" whenever said data on said data carrier have been generated or processed in a way which implies that a content of said data area for further functions does comply with said second specification; and, in the event of transmission, transmitting said status information item together with said header data.

* * * * *